United States Patent

Murschall et al.

[11] Patent Number: 5,254,393
[45] Date of Patent: Oct. 19, 1993

[54] BIAXIALLY ORIENTED MULTI-LAYER POLYOLEFIN FILM

[75] Inventors: Ursula Murschall, Nierstein; Herbert Peiffer, Mainz-Finthen; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 780,059

[22] Filed: Oct. 21, 1991

[30] Foreign Application Priority Data

Oct. 26, 1990 [DE] Fed. Rep. of Germany ....... 4034134

[51] Int. Cl.$^5$ ............... B32B 15/08; B32B 7/02; B32B 27/32; D02J 1/22
[52] U.S. Cl. ................... 428/212; 428/216; 428/330; 428/331; 428/516; 428/349; 264/291; 264/289.3
[58] Field of Search ............ 428/212, 216, 330, 349, 428/331, 516, 910

[56] References Cited

U.S. PATENT DOCUMENTS

| | | | |
|---|---|---|---|
| 3,940,379 | 2/1976 | Castagna et al. | 260/88.2 |
| 4,194,039 | 3/1980 | Mueller | 428/576 X |
| 4,225,644 | 9/1980 | Tsuchiya et al. | 428/516 X |
| 4,230,767 | 10/1980 | Isaka et al. | 428/349 |
| 4,343,852 | 8/1982 | Isaka et al. | 428/216 |
| 4,419,411 | 12/1983 | Park | 428/516 |
| 4,734,317 | 3/1988 | Bothe et al. | 428/215 |
| 4,842,930 | 6/1989 | Schinkel et al. | 428/349 |
| 4,997,700 | 3/1991 | Bothe et al. | 428/216 |
| 5,091,237 | 2/1992 | Schloegl et al. | 428/516 X |

FOREIGN PATENT DOCUMENTS

| | | |
|---|---|---|
| 0008904 | 3/1980 | European Pat. Off. . |
| 0236945 | 9/1987 | European Pat. Off. . |
| 3735272 | 4/1988 | Fed. Rep. of Germany . |
| 2201407 | 9/1988 | United Kingdom . |

Primary Examiner—P. C. Sluby
Attorney, Agent, or Firm—Foley & Lardner

[57] ABSTRACT

The present invention relates to a transparent, coextruded, multi-layer polyolefin film which is heat-sealable on both sides and has a base layer which comprises a peroxidically degraded polypropylene polymer and top layers which comprise heat-sealable ethylene-propylene polymers. The multi-layer film is characterized by high shrinkability in the longitudinal and transverse directions, in combination with excellent optical properties and good runability on high-speed wrapping machines and is especially useful as a packaging or wrapping film. The invention also relates to a process for the preparation of a film of this kind and to its use.

22 Claims, No Drawings

BIAXIALLY ORIENTED MULTI-LAYER POLYOLEFIN FILM

BACKGROUND OF THE INVENTION

The present invention relates to a transparent, coextruded, multi-layer polyolefin film which is heat-sealable on both sides. The multi-layer film is characterized by high shrinkability in the longitudinal and transverse directions, in combination with excellent optical properties and good runability on high-speed wrapping machines. The invention also relates to a process for the preparation of a film of this kind and to its use.

Numerous publications including EP 194,588; Ep 8,904; and U.S. Pat. No. 4,419,111 describe biaxially oriented multi-layer polyolefin films which are heat-sealable on both sides and in which the base layer comprises propylene homopolymers and the two sealing layers, i.e., outer layers or top layers, comprise heat-sealable olefin polymers. These multi-layer polyolefin films have properties which are important for packaging films, i.e., a wide sealing range, good heat-sealability, a relatively high scratch resistance and low friction and thus favorable running characteristics on high-speed packaging machines of various types. However, with respect to optical properties, these films leave much to be desired.

The above-described films are usually prepared in such a manner that they are as dimensionally stable as possible, i.e., these films exhibit the lowest possible shrinkage in the longitudinal and transverse directions. In general, the shrink values of packaging films of this type are less than 4% in the longitudinal direction and less than 2% in the transverse direction, at a temperature of 120° C.

Up to the present, it has been the general opinion that wrappings of an optically pleasing appearance can be produced from films having these low shrink values. However, the packages so prepared actually show loose or baggy wrappings with creases and wrinkles at the edges.

SUMMARY OF THE INVENTION

It is therefore an object of the present invention to provide a biaxially oriented multi-layer polyolefin film which is heat-sealable on both sides, which has excellent optical properties including low film haze and high surface gloss, and a good runability on high-speed wrapping machines, and which yields a tight, wrinkle-free, and crease-free wrapping which has an excellent marketable appearance.

Another object of the invention is to provide a process for producing this film.

In accomplishing the foregoing objects, there has been provided, in accordance with one aspect of the present invention, a multi-layer film which is heat-sealable on both sides, having a longitudinal shrinkage of more than about 7% at 120° C. and a transverse shrinkage of more than about 5% at 120° C. comprising:

a) a base layer comprising a peroxidically degraded polymer containing propylene, and b) at least one heat-sealable layer on either side of the base layer, wherein each of the heat-sealable layers comprises an ethylene-propylene copolymer and an anti-blocking agent.

In accordance with another object of the invention there is provided a process for producing the multi-layer film comprising the steps of:

i) coextruding the melts corresponding to the individual layers of the film through a flat die so as to produce a multi-layer film, ii) solidifying the multi-layer film by cooling, iii) orientating the multi-layer film by stretching it in the longitudinal and transverse directions, iv) heat setting the stretched film, and optionally v) corona-treating and/or flame treating the surface of one or both of the heat-sealable layers.

Further objects, features, and advantages of the present invention will become apparent from the detailed description of preferred embodiments that follows.

DETAILED DESCRIPTION OF THE PREFERRED EMBODIMENTS

Surprisingly, it has been found that a film of the above-described type, which has a longitudinal shrinkage of more than about 7% at 120° C., more preferably of about 8 to about 15%, and transverse shrinkage of more than about 5% at 120° C., more preferably of about 6 to about 12%, gives a wrapping which has a markedly tighter, crease-free, and wrinkle-free appearance, as compared with the dimensionally stable films of the prior art. Due to the tight wrapping which is free of creases and wrinkles, in combination with a low film haze and a high surface gloss, the film-wrapped packages look considerably more attractive and more brilliant and have a marketable appearance.

It has also surprisingly been found that the shrink properties should be kept within narrow limits to achieve the above-mentioned effect.

If longitudinal shrinkage (measured at 120° C.) is substantially lower than about 7% and/or transverse shrinkage (measured at 120° C.) is substantially lower than about 5%, the packages obtained show a loose, baggy wrapping with creases and wrinkles forming at the edges.

If, on the other hand, shrink values in the longitudinal direction are considerably higher than about 15% and/or shrink values in the transverse direction are considerably higher than about 12%, the packages, in particular soft packages, may be deformed by the wrapping. Shrink values which are too high also give rise to unsightly sealed seams, since small shrink creases form in the sealing area.

The longitudinal and transverse shrink values indicated are in each case related to the corresponding linear measure of the film prior to the shrink process. The specified shrink values were determined in a circulating air oven at a temperature of 120° C. and for a duration of 15 min, according to DIN 404 34.

The base layer is comprised essentially of a peroxidically degraded propylene polymer which comprises a predominant amount of propylene and preferably has a melting point in the range of about 162° to about 168° C. An isotactic polypropylene homopolymer having an n-heptane-soluble content of about 6% by weight or less is a preferred propylene polymer.

To obtain the good optical characteristics required, the peroxidically degraded polypropylene preferably has a degradation factor A of about 3 to about 10, more preferably about 4 to about 8. The melt flow index of the starting polypropylene powder is preferably below about 1.5 g/10 min, more preferably about 0.2 to about 0.9 g/10 min (measured according to DIN 53 735, under a load of 21.6N and at 230° C.). By adding organic peroxides such as dialkyl peroxides, preferably 2,5-dimethyl-2,5-di-(t-butyl-peroxy)-hexane or di-t-butyl peroxide during extrusion, the starting polypropylene powder is degraded to a melt flow index of the granules of about 2 to about 5.5 g/10 min (measured according to DIN 53 735, under a load of 21.6N and at 230° C.). The degradation factor A of the polypropylene homopolymer is defined as $$A = \frac{S_{G(PP)}}{S_{R(PP)}}$$

where
$S_{G(PP)}$=melt flow index of the degraded polypropylene granules
and $S_{R(PP)}$=melt flow index of the starting polypropylene powder,
each melt flow index being measured according to DIN 53 735 (21.6N load, 230° C.).

Peroxidic degradation or peroxidically degraded or CR ("controlled rheology") polypropylene homopolymers as such are known in the literature (cf. Plastverarbeiter [Plastic Processors], 38th year, 1987, No. 4; Polymer Engineering and Science, Mar. 1989, Vol. 29, No. 6; Plastverarbeiter, 36th year, 1985, No. 11). Peroxidically degraded polypropylene homopolymers of this kind are used, in particular, in injection molding and fiber production. However, the magnitude of the degradation factor for these products is not specified.

Surprisingly, it has been found that the degradation factor of the polypropylene homopolymer of the base layer must be kept within narrow limits, if the films of the present invention are to be successfully employed as wrapping films.

If the degradation factor of the polypropylene homopolymer is below about 3, the optical properties of the film are impaired, i.e., pronounced increase of film haze and reduction of surface gloss results. If the degradation factor is greater than about 10, problems occur in the stretching process, which has an extremely adverse influence on the safe running during film production. A polypropylene homopolymer having a degradation factor above about 10 is either no longer stretchable or can only be stretched in a very narrow temperature range.

The heat-sealable surface layers essentially comprise a random ethylene-propylene-copolymer which preferably has an ethylene content of about 2 to about 8% by weight, more preferably about 3 to about 7% by weight, preferably a distribution factor $V_F$ greater than about 8 and preferably a thermooxidation temperature $T_{OX}$ above about 230° C.

The ethylene content and the distribution factor of the copolymer were determined with the aid of $^{13}$C-NMR spectroscopy. Measurements were made using a HX-270 nuclear magnetic resonance spectrometer, manufactured by Bruker (Germany), equipped with a Bruker Aspect 2000 computer. In the measurements, the ethylene-propylene copolymer to be characterized was dissolved in a solvent mixture comprised of 65% by volume of hexachlorobenzene and 35% by volume of 1,1-dideuterotetrachloroethane to give a 10% by weight solution. As reference standard octamethyltetrasiloxane (OMTS) was added. The 67.9 MHz $^{13}$C-nuclear magnetic resonance spectrum was measured at 130° C. The spectra obtained were evaluated according to the method described in J. C. Randall, Polymer Sequence Distribution (Academic Press, New York, 1977).

The distribution factor is defined as:

$$V_F = \frac{C_i}{C_G - C_i}$$

where
$C_G$=the total ethylene content in the copolymer in percent by weight, and
$C_i$=the amount of ethylene in percent by weight, which is present as isolated ethylene proportion, i.e., as shown in the draft below, an individual ethylene unit is present in isolated position when between two propylene units:

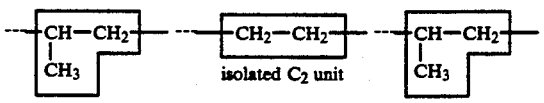
isolated $C_2$ unit

The idealized thermooxidation temperature $T_{OX}$ was determined as follows: A quantity of 2 to 5 mg of the raw material to be examined were heated in a differential calorimeter at a heating rate of 20K/min, starting from a temperature of 295K. Air was used as rinsing gas. In the measuring process, the variation of heat flow with rising temperature was graphically represented. After melting of the raw material, the curve obtained first extended almost horizontally (base line) while, starting from a particular temperature, the values measured rose steeply as a result of oxidation (exothermic branch). The idealized thermooxidation temperature is defined as the crossing point between the straight line which prolongs the exothermic branch of the thermogram and the base line.

It has unexpectedly been found that the parameters specified above for the propylene-ethylene copolymer of the polyolefin top layers of the film should be kept within very narrow limits, if all properties mentioned in the statement of object are to be simultaneously achieved in an optimum manner. The ethylene content and the distribution factor $V_F$ of the copolymer are important for the ability of the film to be surface treated by means of electrical corona discharge, for long-term printability, and for optical properties. If the ethylene content is below about 2.0% by weight, the ability of the film to be corona treated deteriorates and the decay behavior of the treatment intensity becomes unfavorable. If the ethylene content is greater than about 7.0% by weight or the distribution factor is below about 8, the optical properties, in particular surface gloss, become worse.

The thermooxidation temperature is particularly important for ink adhesion. If the thermooxidation temperature of the printable top layer is below about 230° C., degradation products resulting from the corona treatment form on the surface to such an extent, that adhesion of the printing ink is impaired.

According to the present invention, the top layers contain at least one antiblocking agent. Any known antiblocking agents are useful. Preferred agents include inorganic additives such as silicon dioxide, calcium carbonate and magnesium silicate and/or organic antiblocking agents comprising polyamides, polyesters and, in particular, benzoguanamine-formaldehyde copolymers, and the like. The antiblocking agent preferably has an average particle size between about 1 and about 6 μm, more preferably between about 2 and about 5 μm. The preferred antiblocking agents are silicon dioxide and calcium carbonate.

Preference is given to antiblocking agents which have a spherical shape. Such spherical inorganic materials and the addition of the latter to thermoplastics films are described, for example, in EP-A-236,945 and DE-A-38 01 535. The added amount of antiblocking agent is preferably about 0.1 to about 2.0% by weight, more preferably about 0.1 to about 0.5% by weight, relative to the total weight of the top layer.

The thicknesses of the heat sealing layers are preferably greater than about 0.4 μm, more preferably between about 0.4 to about 1.0 μm. If the layer thickness is less than about 0.4 μm, heat sealing properties deteriorate drastically, i.e., increase of minimum sealing temperature and/or reduction of strength of sealed seam occurs. If the layer thickness exceeds about 1.0 μm the optical properties and the processing behavior of the film become worse.

In order to further improve certain properties of the polyolefin film according to the invention, both the base layer and the heat sealing layers may contain appropriate additives in an effective amount. Such additives include antistatic agents, lubricants, stabilizers, neutralizing agents, or mixtures thereof.

Any known antistatic agent can be used. Preferred antistatics include alkali metal alkanesulfonates; polyether-modified, i.e., ethoxylated and/or propoxylated polydiorganosiloxanes, including polydialkylsiloxanes, polyalkylphenylsiloxanes and the like; and/or essentially straight-chain and saturated, aliphatic, tertiary amines which contain an aliphatic radical having 10 to 20 carbon atoms and are substituted by ω-hydroxy($C_1$–$C_4$)alkyl groups, of which N,N-bis(2-hydroxyethy)alkylamines containing ($C_{10}$–$C_{20}$)-, preferably ($C_{12}$–$C_{18}$)-alkyl groups are particularly suitable. The effective amount of antistatic is generally in the range of about 0.05 to about 0.3% by weight, based on the weight of the layer.

Any known lubricant can be used. Preferred lubricants include higher aliphatic acid amides, higher aliphatic acid esters, waxes, metal soaps, and polydimethylsiloxane. The effective amount of lubricant is generally in the range of about 0.1 to about 3% by weight, based on the weight of the layer. It is particularly advantageous to add about 0.15 to about 0.25% by weight of a higher aliphatic acid amide, for example, erucic acid amide, to the base layer and/or the top layers. Very good results are also obtained when polydimethylsiloxane is added to one or more of the top layers. The amount of polydimethylsiloxane added is preferably in the range of about 0.3 to about 2.0% by weight of the layer. The preferred viscosity of the polydimethylsiloxane is between about 10,000 and about 1,000,000 mm$^2$/s.

Any known stabilizers are useful. A phenolic stabilizer which has a molar mass of more than about 500 g/mol is preferred. Stabilizers which can be employed include, in particular, pentaerythrityl-tetrakis-3-(3,5-di-tertiary butyl-4-hydroxyphenyl)-propionate and 1,3,5-timethyl-2,4,6-tris(3,5-di-tertiary butyl-4-hydroxybenzyl)-benzene. The amount of stabilizer added is preferably about 0.1 to 0.6% by weight, more preferably about 0.15 to about 0.3% by weight, based on the weight of the layer.

In order to neutralize the catalyst residues present in the raw material of the base layer and in the raw material of the top layers, any neutralizers can be used. Calcium stearate and/or calcium carbonate are preferably employed which preferably have an average particle size of not more than about 0.07 mm, an absolute particle size of less than about 5 μm and a specific surface area of at least about 40 m$^2$/g. The neutralizers are preferably added in an amount of about 0.01 to about 0.05% by weight based on the weight of the layer.

The ethylene-propylene copolymer of the top layers preferably has a lower melting point than the peroxidically degraded polypropylene of the base layer. The melting point of the copolymer is, in general, in the range of about 80° to about 150° C.

The melt flow index of the copolymer used in the heat-sealing layers is preferably higher than the melt flow index of the polypropylene of the base layer. In general, the ethylene-propylene copolymer has a melt flow index of about 5 to about 12 g/10 min at 230° C. and under a load of 21.6N (DIN 53 735).

The total thickness of the multi-layer film of the present invention may vary within wide limits and depends, in particular, on the intended use. The total film thickness is preferably about 10 to about 60 μm, more preferably about 15 to about 40 μm. The heat-sealing layers each preferably are thicker than about 0.4 μm, more preferably about 0.5 to about 1.0 μm thick. Preferably, the thickness of the base layer amounts to about 50 to 90% of the total film thickness.

The multi-layer film according to the present invention is distinguished, in particular, by its excellent optical properties and the above-described increased shrink properties in the longitudinal and transverse directions. The surface gloss of the film (measuring angle 20°) is preferably greater than about 100, more preferably about 105 to about 130, as determined according to DIN 67 530. Film haze (measured on 4 film layers) is preferably less than about 22%, more preferably about 10 to about 18%, haze being measured in accordance with ASTM-D 1003-52.

The high shrink values described are unexpectedly obtained by modifying the customary process conditions as follows:
  lowering the stretching temperature
  increasing longitudinal draw ratio
  reducing the transverse draw ratio
  increasing convergence Specifically, in the process of the invention, the melts corresponding to the individual film layers are extruded or coextruded through a flat-sheet die to prepare first a cast sheet which is then solidified on a cooling drum and thereafter oriented by stretching in the longitudinal and transverse directions.

The conditions chosen for longitudinal stretching are such that the resulting longitudinally stretched film is highly oriented. This will give particularly favorable conditions for obtaining a high longitudinal shrinkage. Longitudinal stretching is preferably carried out at a temperature of less than about 120° C., more preferably in the range from about 95° to about 115° C., and at a draw ratio of preferably more than about 5:1, more preferably in the range from about 5.5:1 to about 8.0:1.

Preferred transverse stretching temperatures are higher than about 140° C., more preferably in the range from about 145° to about 160° C. The transverse stretching draw ratio, on the other hand, preferably should not exceed a value of about 10:1 and is more preferably in the range of from about 9:1 to about 6:1.

Stretching of the film in the transverse direction is followed by a final heat-setting stage. In a preferred heat-setting stage, the film is convergently conveyed onward in the draw tenter, at a temperature which is preferably about 20° to about 40° C. below the stretching temperature, preferably at a temperature below about 130° C. and particularly preferably below about 120° C. Convergence in the heat-setting stage is preferably about 15 to about 20%.

The ability of the film to be printed, metallized, or bonded is attained by one of the customary surface treatments which are carried out prior to winding up the film, e.g., electrical corona treatment and/or flame treatment. Treating intensities are within the usual range, preferably about 36 mN/m, more preferably about 38 to about 41 mN/m.

The shrinkable multi-layer film of the present invention possesses a combination of properties which make it particularly suitable for its preferred intended use as a packaging film or wrapping film employed on high-speed wrapping machines. The film has all the properties required of polyolefin films for producing a tight, crease-free and wrinkle-free, brilliant wrapping which has an excellent marketable appearance.

The multi-layer film according to the present invention exhibits, in particular:

high longitudinal shrinkage (measured at 120° C.) of more than about 7%, preferably from about 8 to about 15% high transverse shrinkage (measured at 120° C.) of more than about 5%, preferably from about 6 to about 12%, low film haze and homogeneous optical appearance, high surface gloss on both sides, heat-sealability on both sides, high scratch resistance of both surface layers, good ability to be surface treated, good properties for immediate and long-term printability and coatability, good properties for further processing.

If the flame or corona treatment is omitted, the multi-layer polyolefin film of the present invention can be used, in particular, as a wrapping film for cigarette packs, since, apart from the important properties which are required in view of high-speed packaging machines, it also exhibits an extremely low haze and high gloss. In addition, the film also gives a very tight, crease-free and wrinkle-free wrapping for cigarette packs, which looks brilliant and appealing.

The invention is described in greater detail below with reference to working examples.

EXAMPLE 1

By use of the coextrusion process, a three-layer film of 1 mm total thickness is extruded through a flat-sheet die at an extrusion temperature of 260° C. The base layer of the three-layer film comprises a peroxidically degraded isotactic polypropylene homopolymer having an n-heptane soluble content of 4.5% by weight and a melting point of 165° C., as the principal component.

The polypropylene polymer was degraded from a starting polypropylene powder having a melt flow index $S_{F(PP)}$ of 0.7 g/10 min (determined in accordance with DIN 53 735 under a load of 21.6N and at 230° C.) by addition of di-t-butyl peroxide to give a melt flow index of the granules $S_{G(PP)}$ of 3.5 g/10 min (DIN 53 735 under a load of 21.6N and at 230° C.), giving a degradation factor A of 5.

The base layer is enclosed between two heat-sealing layers (outer layers, top layers), i.e., the three-layer film has an A-B-A structure (A=heat-sealing layers, B=base layer).

All the layers contain 0.12% by weight of pentaerythrityl-tetrakis-3-(3,5-di-tertiary-butyl-4-hydroxyphenyl)-propionate (Irganox 1010®) for stabilization and 0.06% by weight of calcium stearate for neutralization of acidic catalyst residues. The base layer also contains 0.15% by weight of N,N-bis-(2-hydroxyethyl)-N-($C_{10}$-$C_{20}$)alkylamine (Armostat 300®) as antistatic agent.

The polyolefin heat-sealing layers comprise a random copolymer formed of ethylene and propylene units, having an ethylene content of 4.5% by weight and a propylene content of 95.5% by weight. These layers additionally contain 0.33% by weight of silicon dioxide having an average particle diameter of 2.0 μm and 0.8% by weight of polydimethylsiloxane having a kinematic viscosity of 30,000 mm²/s at 25° C. The ethylene-propylene copolymer has the following characteristics:

distribution factor: $V_F$=17
idealized thermooxidation temperature: 256° C.
melt flow index: 6.0 g/10 min (DIN 53 735)
melting point: 135° C.

The biaxially oriented, multi-layer polyolefin film is prepared via the process steps of coextrusion, cooling, longitudinal stretching, transverse stretching and heat-setting. The total thickness of the biaxially oriented film is 20 μm, each top layer being 0.8 μm thick.

The conditions of preparation in the individual process steps are as follows:

| | |
|---|---|
| extrusion | extrusion temperature 260° C. |
| | temperature of draw-off roll 60° C. |
| longitudinal stretching | stretch roll T = 107° C. |
| | cooling drum T = 90° C. |
| | longitudinal draw ratio $S_L$ = 6.5 |
| transverse stretching | heating zones T = 163° C. |
| | stretching zones T = 148° C. |
| | transverse draw ratio $S_T$ = 8 |
| heat-setting | temperature T = 120° C. |
| | duration t = 2 s |
| convergence | 18% |

EXAMPLE 2

The process of example 1 is repeated with the following differences. The isotactic polypropylene homopolymer of the base layer, is degraded from a starting polypropylene powder having a melt flow index $S_{F(PP)}$ of 0 5 g/10 min (determined in accordance with DIN 53 735 under a load of 21.6N and at 230° C.) by addition of di-t-butyl peroxide to give a melt flow index of the granules $S_{G(PP)}$ of 3.5 g/10 min (DIN 53 735 under a load of 21.6N and at 230° C.), giving a degradation factor A of 7.

The three-layer film prepared in this example has, however, an A-B-C structure (A=heat-sealing layer, C=a different heat-sealing layer, B=base layer). Layer A contains 1.6% by weight of polydimethylsiloxane having a kinematic viscosity of 500,000 mm²/s at 25° C. and 0.3% by weight of silicon dioxide having a mean particle diameter of 4 μm. Layer C contains 0.33% by weight of silicon dioxide having an average particle diameter of 2 μm and no polydimethylsiloxane. Layer C is corona-treated, the surface tension of this layer being 40 mN/m, immediately after production.

The conditions of preparation in the individual process steps correspond to those of Example 1.

COMPARATIVE EXAMPLE 1

A three-layer film is prepared as in Example 1 with the following differences. The isotactic propylene homopolymer has a melt flow index of the granules of 3.5 g/10 min (DIN 53 735 under a load of 21.6N and at 230° C.). The polypropylene polymer of the base layer has, however, not been peroxidically degraded.

The conditions of preparation in the individual process steps are as follows:

| | |
|---|---|
| extrusion | extrusion temperature 260° C. |
| | temperature of draw-off roll 60° C. |
| longitudinal | stretching roll T = 120° C. |
| stretching | cooling drum T = 100° C. |
| | longitudinal draw ratio $S_L$ = 5 |
| transverse | heating zones T = 175° C. |
| stretching | stretching zones T = 162° C. |
| | transverse draw ratio $S_T$ = 10 |
| heat-setting | temperature T = 130° C. |
| | duration t = 5 s |
| convergence | 10% |

COMPARATIVE EXAMPLE 2

A three-layer film having an A-B-C structure is prepared in accordance with Example 1 of European Patent 194,588.

COMPARATIVE EXAMPLE 3

A three-layer film is prepared in accordance with Example 4 of U.S. Pat. No. 4,419,411.

In addition to the measuring methods previously discussed, the following measurement methods were used to characterize the raw materials and films:

Melt flow index:
DIN 53 735 under a load of 21.6N and at 230° C.

Melting point:
DSC measurement, maximum of melting curve, heating rate 20° C./min.

Haze:
The haze of the film is measured in accordance with ASTM-D 1003-52, using a 1° slit diaphragm instead of a 4° pinhole diaphragm, and the haze is indicated in percent for four film layers one on top of the other. The four layers were selected since the optimum measurement range is thereby utilized. The haze evaluation was carried out with:

≦17%=very good (++)
>17% to 20%=good (+)
≧20% to 25%=moderate (±)
≧25%=poor (−)

Gloss:
The gloss is determined in accordance with DIN 67 530. The reflector value is measured as an optical characteristic of the surface of a film. In accordance with ASTM-D 523-78 and ISO 2813 standards, the angle of incidence was set at 20°. A light beam hits the planar test surface at the set angle of incidence and is reflected or scattered by this surface. The light beams hitting the photoelectronic receiver are indicated as a proportional electrical quantity. The measurement value is dimensionless and must be indicated together with the angle of incidence. The gloss is assessed (angle of incidence 20°) with:

≧115=very good (++)
<115 to 110=good (+)
≦110 to 100=moderate (±)
≦100=poor (−)

Scratch resistance or scratch sensitivity:
The scratch resistance is determined in accordance with DIN 53 754. The scratch resistance is determined using the Taber model 503 Abraser from Teledyne Taber, using Calibrade R H18 abrasive wheels at a load of 250 g. Scratch resistance or scratch sensitivity is taken to mean the increase in haze of the scratched film compared with the original film after 50 revolutions of the sample plate. The scratch resistance is very good (++) if the increase in haze is less than 22%, good (+) if the increase in haze is from 22 to 25%, moderate (±) if the increase in haze is from 25 to 30%, and poor (−) if the increase in haze is greater than 30%.

Determination of the strength of the sealed seam:
Two 15 mm wide film strips are placed one on top of the other and heat-sealed at 130° C. for a sealing time of 0.5 s and at a sealing pressure of 1.5N/cm² (apparatus used: Brugger NDS, sealer jaw heated on one side). The strength of the sealed seam is determined by the T-peel method.

Determination of minimum sealing temperature:
Heat-sealed samples (sealed seam 20 mm×100 mm) are prepared using the HSG/ET heat sealing apparatus of Brugger. For this purpose, a film is heat-sealed at different temperatures with the aid of two heated sealer jaws, at a sealing pressure of 15N/cm² and for a sealing time of 0.5 s. Test strips having a width of 15 mm are cut from the heat-sealed samples. The S-strength of sealed seam, i.e., the force required for the separation of the test strips is determined in a tensile tester at a pulling rate of 200 mm/min, the plane of the sealed seam being at right angles to the pulling direction. The minimum sealing temperature is the temperature at which a strength of the sealed seam of at least 0.5N/15 mm is reached.

Determination of the corona-treatment intensity:
The corona treatment is carried out in such a manner that the treated film surface, in each case, preferably has a treatment intensity of 38–41 mN/m immediately after the treatment. The treatment intensity is determined by the so-called ink method (DIN 53 364).

Long-term treatment intensity:
The treatment intensity is repeatedly measured at intervals of 14 days. The decay behavior is termed very good, if the treatment intensity is still at least 37 mN/m (ΔB≦2 mN/m) after a period of 4 months. The decay behavior is termed poor, if the treatment intensity is less than 35 mN/m (ΔB≧4 mN/m).

Shrinkage:
The longitudinal and transverse shrink values are in each case related to the corresponding linear measure of the film prior to the shrink process. The shrink values are determined in a circulating air oven, at a temperature of 120° C. and a duration of 15 min, according to DIN 404 34.

Machine runability:
Runability on a wrapping machine is visually determined and rated as follows:

| | | |
|---|---|---|
| very good | (++) | <2% of the sample packages are poorly wrapped |
| good | (+) | 2–6% of the sample packages are poorly wrapped |
| moderate | (+−) | 6–12% of the sample packages are poorly wrapped |
| poor | (−) | 12% and more of the sample packages are |

| | | -continued | | | | | |
|---|---|---|---|---|---|---|---|
| | | poorly wrapped | | | | | |

Appearance of wrapping:

The appearance of wrapping is visually assessed (see Table 1).

The superiority of the film according to the present invention corresponding to Example 1 and Example 2 is evident from Table 1. Although Comparative Examples 1 to 3 show good properties in some aspects, it is nevertheless impossible for any of the multi-layer films according to the comparative examples to meet all requirements at the same time.

All of the prior art multi-layer films have markedly lower shrink values in the longitudinal and transverse directions and thus produce a loose and baggy wrapping of packages with creases and wrinkles at the edges. In addition, the multi-layer films of the prior art exhibit a markedly higher film haze and lower surface gloss.

Only the multi-layer films of the present invention corresponding to Examples 1 and 2 meet all requirements simultaneously and, due to the tight, crease-free and wrinkle-free wrapping produced, in combination with good optical properties, lead to wrapped packages that look attractive and brilliant and have an excellent marketable appearance.

TABLE 1

| | Haze (4 layers) [%] | Gloss (measuring angle 20°) | | Scratch Resistance [%] | | Longitd. Shrinkage (120° C./15 min) [%] | Transv. Shrinkage (120° C./15 min) [%] | Machine Runability (visual assessment) Wrapping Mach. | Appearance of Wrapping (visual assessm.) |
|---|---|---|---|---|---|---|---|---|---|
| | | Side 1 | Side 2 | Side 1 | Side 2 | | | | |
| E1 | ++ | ++ | ++ | ++ | ++ | 12.0 | 9.0 | ++ | tight, crease-free |
| E2 | ++ | ++ | ++ | ++ | ++ | 11.0 | 9.0 | ++ | tight, crease-free |
| CE1 | ± | ± | ± | ++ | ++ | 3.5 | 2.0 | + | loose, baggy, wrinkles and creases at the edges |
| CE2 | − | − | − | ± | ± | 2.5 | 1.5 | ± | loose, baggy, wrinkles and creases at the edges |
| CE3 | − | − | − | ± | ± | 3.0 | 1.5 | ± | loose, baggy, wrinkles and creases at the edges |

E = Example
CE = Comparative Example

What is claimed is:

1. A biaxially oriented, shrinkable, multi-layer film which is heat-sealable on both sides, having a longitudinal shrinkage of more than about 7% at 120° C. and a transverse shrinkage of more than about 5% at 120° C. comprising:
   a) a base layer consisting essentially of a peroxidically degraded polypropylene, and
   b) at least one heat-sealable layer on either side of said base layer, wherein each of said heat-sealable layers comprises an ethylene-propylene copolymer and an anti-blocking agent.

2. A multi-layer film as claimed in claim 1, wherein said longitudinal shrinkage is about 8 to about 15% and said transverse shrinkage is about 6 to about 12%.

3. A multi-layer film as claimed in claim 1, wherein the peroxidic degradation factor of said propylene homopolymer is in the range of about 3 to about 10.

4. A multi-layer film as claimed in claim 1, wherein said copolymers comprise about 2 to about 8% by weight of ethylene, based on the total weight of said copolymer.

5. A multi-layer film as claimed in claim 1, wherein the distribution factor of each of said copolymers is greater than about 8.

6. A multi-layer film as claimed in claim 1, wherein the thermooxidation temperature of each of said copolymers is greater than about 230° C.

7. A multi-layer film as claimed in claim 1, wherein the surface gloss of the film is greater than about 100.

8. A multi-layer film as claimed in claim 1, having a haze value of less than about 22%, measured according to ASTM-D 1003-52.

9. A multi-layer film as claimed in claim 1, wherein the antiblocking agent comprises silicon dioxide, calcium carbonate, or mixtures thereof, having an average particle size of about 1 to about 6 µm.

10. A multi-layer film as claimed in claim 1, which comprises about 0.1 to about 2.0% of said anti-blocking agent in each of said heat-sealable layers, based on the total weight of each of said heat-sealable layers.

11. A multi-layer polyolefin film as claimed in claim 1, wherein at least one of said outer heat-sealing layers is corona-treated.

12. A multi-layer film as claimed in claim 10, wherein the outer corona-treated heat-sealing layer or layers has, immediately after production, a surface tension of more than about 36 mN/m.

13. A multi-layer film as claimed in claim 1, wherein the thickness of each heat-sealing layer is greater than about 0.4 µm.

14. A multi-layer film as claimed in claim 12, wherein the total film thickness is about 10 to about 60 µm.

15. A multi-layer film as claimed in claim 1, wherein said polypropylene comprises an isotactic polypropylene homopolymer.

16. A multi-layer film as claimed in claim 1, wherein said copolymers consist of ethylene and propylene monomers.

17. A multi-layer film as claimed in claim 1, wherein at least one of the base layer and the heat-sealing layers comprise additives, wherein said additives are selected from the group consisting of lubricants, anti-static agents, neutralizing agents, stabilizers, and mixtures thereof.

18. A package or wrapping film comprising a multi-layer film as claimed in claim 1.

19. A wrapping film for cigarette packs comprising a multi-layer film as claimed in claim 1.

20. A multi-layer film as claimed in claim 1, which is produced by a process comprising the steps of:
   i) coextruding the melts corresponding to the individual layers of said film through a flat die so as to produce a multi-layer film,
   ii) solidifying said multi-layer film by cooling,
   iii) orienting said solidified multi-layer film by stretching it in the longitudinal and transverse directions, iv) heat setting said stretched film, and optionally v) corona-treating and/or flame treating the surface of one or both of said heat-sealable layers.

21. A multi-layer film as claimed in claim 20, wherein said longitudinal stretching is carried out at a temperature of less than about 120° C. and at a draw ratio of more than about 5.

22. A multi-layer film as claimed in claim 20, wherein said transverse stretching is carried out at a temperature of higher than about 140° C. and at a stretching ratio of equal to or less than about 10:1.

* * * * *

UNITED STATES PATENT AND TRADEMARK OFFICE
CERTIFICATE OF CORRECTION

PATENT NO. : 5,254,393
DATED : October 19, 1993
INVENTOR(S) : MURSCHALL ET AL.

It is certified that error appears in the above-indentified patent and that said Letters Patent is hereby corrected as shown below:

Column 11, lines 60 and 61, claim 3, delete "propylene homopolymer" and insert --polypropylene--.

Column 12, claim 18, line 56, delete "package" and insert --packaging--.

Signed and Sealed this

Twenty-fourth Day of May, 1994

*Attest:*

BRUCE LEHMAN

*Attesting Officer*   *Commissioner of Patents and Trademarks*